(12) United States Patent
Ballas et al.

(10) Patent No.: US 7,520,699 B2
(45) Date of Patent: Apr. 21, 2009

(54) CUTTING TOOL AND CUTTING INSERT

(75) Inventors: Assaf Ballas, Akko (IL); Carol Smilovici, Nahariya (IL)

(73) Assignee: Iscar, Ltd. (IL)

( * ) Notice: Subject to any disclaimer, the term of this patent is extended or adjusted under 35 U.S.C. 154(b) by 0 days.

(21) Appl. No.: 11/964,548

(22) Filed: Dec. 26, 2007

(65) Prior Publication Data

US 2008/0170916 A1 Jul. 17, 2008

(30) Foreign Application Priority Data

Jan. 11, 2007 (IL) .................................... 180660

(51) Int. Cl.
*B23C 5/20* (2006.01)
*B23B 27/22* (2006.01)

(52) U.S. Cl. .................... 407/113; 407/115; 407/33; 407/67

(58) Field of Classification Search ......... 407/113–116, 407/66, 67, 103, 107, 61, 30, 33
See application file for complete search history.

(56) References Cited

U.S. PATENT DOCUMENTS

| | | | |
|---|---|---|---|
| 4,597,696 A * | 7/1986 | Maeda et al. ............... 407/114 |
| 4,708,537 A | 11/1987 | Elka et al. |
| 5,052,863 A | 10/1991 | Satran |
| 5,071,292 A | 12/1991 | Satran |
| 5,078,550 A | 1/1992 | Satran et al. |
| 5,145,295 A | 9/1992 | Satran |
| 5,207,538 A | 5/1993 | Satran |
| 5,460,464 A * | 10/1995 | Arai et al. ................... 407/114 |
| 5,775,855 A * | 7/1998 | Reiterman et al. ............. 407/42 |
| 6,142,716 A * | 11/2000 | Jordberg et al. ............. 407/114 |
| 6,939,090 B1* | 9/2005 | Nagaya et al. ................ 407/54 |
| 7,040,844 B1 | 5/2006 | Daiguji |
| 2006/0210364 A1 | 9/2006 | Bellmann et al. |

FOREIGN PATENT DOCUMENTS

| | | |
|---|---|---|
| DE | 10052963 | 5/2002 |
| EP | 1075889 B1 | 8/1999 |
| WO | WO03101654 | 12/2003 |

\* cited by examiner

*Primary Examiner*—Willmon Fridie
(74) *Attorney, Agent, or Firm*—Womble Carlyle (57) ABSTRACT

A four-sided cutting insert has a top surface, a bottom surface, and a pair of first side surfaces connected to a pair of second side surfaces via corner surfaces. The cutting insert has a rotational axis of symmetry, a first axis extending along the first side surfaces and second axis extending along the second side surfaces. Opposite corners of the cutting insert are provided with a first pair of corner edges defined between a first edge and an associated second edge. Proximate its leading end, the first edge has a main portion which, in a top view of the insert, extends inwardly toward the first axis at a first angle. In a side view, the first edge slopes downwardly from the corner edge in the direction of the base surface. The associated second edge, in the top view of the insert, extends from the corner edge in an outward direction relative to the second axis.

26 Claims, 7 Drawing Sheets

CUTTING TOOL AND CUTTING INSERT

FIELD OF THE INVENTION

The present disclosure relates to a cutting insert and to a holder for such a cutting insert as well as to a combination of a holder and such one or more cutting inserts. Furthermore, the present disclosure relates to a method for forming a cutting insert and/or the use of such cutting inserts and/or holders, and/or a method for designing cutting inserts for holders.

BACKGROUND OF THE INVENTION

Cutting inserts and holders for such cutting inserts, particularly for cutting metal, are known in the art. Such cutting inserts and holders, also known as cutting tools, are commonly used for rotary cutting operations such as drilling, milling, and the like.

For example, rotary cutting tools for milling a 90° shoulder in a workpiece are known. Such tools are generally designed to hold cutting members having a lateral cutting edge which generates a cylindrical or substantially cylindrical envelope of revolution which is substantially parallel to the rotary axis of the cutting tool and thus being capable of milling a 90° shoulder in a workpiece.

When using such cutting inserts or cutting tools under demanding machining conditions, however, stability issues may arise due to the great magnitude of cutting forces which may potentially be created by the demanding conditions of the cutting process. In particular, the cutting forces of the rotary cutting tool described above include a sum total of a torque of each cutting insert generated while milling the workpiece, the torque being the product of cutting forces acting on each cutting edge portion and a radius of the cylindrical envelope of revolution of each cutting edge portion. Thus, employing lateral cutting edges of the cutting tool translates into greater magnitude of cutting forces as compared to employing, for example, face cutting edges. Furthermore, there may be an excessive load on, and/or vibrations of, the cutting members and/or cutting tool. Moreover, damages to the machined surface of a workpiece may occur. These issues may limit the use of conventional cutting members and/or cutting tools.

Accordingly, in order to facilitate cutting even when demanding conditions exist, cutting members have been designed for rapid removal of large amounts of material on a workpiece. In such machining operations, while the depth of a cut may potentially be shallow, e.g., up to 2 mm, the lateral feed rate is very high, e.g., up to 3-4 mm per tooth of the cutter. Such inserts are very effective for rough machining, e.g., of what may be called "tubs", i.e., deep pockets formed in a solid metal workpiece as may be customary in, for example, the die and mold manufacturing industry. The main cutting edge of such cutting members may be disposed adjacent the face of the cutting tool and may potentially extend transversely to the axis of rotation of the cutting tool.

It is known that in order to facilitate cutting even when demanding conditions exist, a longitudinal edge of the cutting insert may potentially be relieved from a sidewall of the machined workpiece, to relieve excess load on, and/or vibrations of, the cutting tool. To achieve this, it is known to design a special tool with tilted insert pockets, so that cutting inserts positioned in such specially-manufactured, tilted pockets will have a lateral edge thereof relieved from the sidewall of the workpiece.

From U.S. Pat. No. 5,052,863 there is known, for use in a peripheral rotary milling cutter having a cylindrical holder and at least one replaceable, peripherally disposed cutting insert, a cutting insert is formed with its lateral cutting edge being curved and forming part of the curved side of a slanted plane which intersects a cylinder constituting a surface of revolution of said lateral cutting edge at an angle corresponding to the axial rake of the lateral cutting edge in cutting member which is mounted in the milling cutter.

From U.S. Pat. No. 5,071,292 there is known, for use in a peripheral rotary milling cutter having a cylindrical holder and at least one replaceable, peripherally disposed cutting insert, a cutting insert being formed with cutting rake and the relief flank surfaces that are continuously curved so that the insert rake and relief angles as defined with respect to the cylindrical holder remain substantially invariant along the length of the cutting edge.

From U.S. Pat. No. 5,078,550 there is known, for use in a peripheral rotary milling cutter having a cylindrical holder and at least one replaceable, peripherally disposed cutting insert, having a side relief flank that comprises first and second component side relief surfaces intersecting at an intersection line extending along the side relief flank from a first position adjacent a leading end of the insert and located at an intermediate position thereof to a second position intersecting said cutting edge and adjacent a trailing end of the insert, said component flank surfaces being substantially planar and being angularly disposed with respect to one another so that an insert side relief angle as defined with respect to the cylindrical holder in the region of the leading end substantially equals an insert side relief angle in the region of the trailing end.

From U.S. Pat. No. 5,145,295 there is known, for use in a peripheral rotary cutter having a cylindrical holder and at least one replaceable, peripherally disposed cutting insert, a cutting insert being formed with a relief flank surface comprising a first portion defined between said cutting edge and an intermediate portion of said relief flank surface and a second portion defined between said intermediate portion and the base of the insert, said first portion presenting a first relief flank angle, said second portion presenting a second relief flank angle, said relief flank angel being significantly greater than said second relief flank angle when said intermediate portion which bridges said first and second portions being directed transversely with respect to said first and second portions.

From U.S. Pat. No. 5,207,538 there is known, for use in a peripheral rotary milling cutter having a cylindrical holder in at least one replaceable peripherally disposed cutting insert, a cutting insert being formed with a relief flank surface comprising a first portion defined between said cutting edge and an intermediate portion of said relief flank surface and a second portion defined between said intermediate portion and the base of the insert, said first portion presenting a first relief flank angle, said second portion presenting a second relief flank angle, said first relief flank angle being significantly greater than said second relief flank angle when said intermediate portion which bridges said first and second portions being directed transversely with respect to said first and second portions.

As can be seen, e.g., in FIG. 14 of U.S. Pat. No. 5,207,538 and U.S. Pat. No. 5,145,295, the respective cutting inserts may be mounted in a holder so that a lateral cutting edge is parallel to the axis of rotation of the rotary milling cutter for machining a 90° shoulder in a workpiece.

U.S. Pat. No. 4,708,537 discloses a metal cutting tool having an exchangeable cutting insert mounted on a replaceable cartridge seat releasably fitted in a holder of the cutting tool and particularly, inserts clamped in the respective cutting tool are positioned to provide a lateral cutting edge being parallel to the axis of rotation of the rotary cutting tool in order to allow milling of a 90° shoulder in a workpiece.

European patent application 1 075 889 relates to a rotary cutting tool having at least one indexable insert wherein the insert has a main cutting edge and an outer peripheral cutting edge. Said main cutting edge is disclosed as being inclined at a cutting edge angle and as being shaped like an arc or a substantially arc wherein said outer peripheral cutting edge is shaped like a straight line, an arc, or a substantially arc, so as to be back-tapered with respect to the center axis of tool. The respective arrangement is discussed as suppressing chattering-vibration and as realizing a stable and high efficiency working.

U.S. patent application Ser. No. 5,460,464 refers to a cutting insert comprising lateral cutting edge ridges being inclined by an angle and front cutting edge ridges being inclined as an angle vis-à-vis a rectangular base shape.

SUMMARY OF THE INVENTION

In one aspect, the present invention is directed to a cutting insert. The inventive cutting insert include opposing top and bottom surfaces and a peripheral side surface extending between the top and bottom surfaces. The peripheral side surface comprises opposing first side surfaces connecting to opposing second side surfaces. Each of the first side surfaces and the second side surfaces comprises at least one abutment surface portion suitable for seating the cutting insert. A top peripheral edge is formed between the peripheral side surface and the top surface. The top peripheral edge comprises opposing first edges at the intersection of the first side surfaces with the top surface, opposing second edges at the intersection of the second side surfaces with the top surface with the two opposing first edges extending transversely to the two opposing second edges. The top peripheral edge further comprises a first pair of diagonally opposed first corner edges, each first corner edge defined between a leading end of a first edge and an associated second edge. The top peripheral edge further comprises a second pair of diagonally opposed second corner edges, each second corner edge defined between a trailing end of a first edge and an adjacent second edge. The cutting insert has a symmetry axis S extending through the opposing top and bottom surfaces about which the insert has a 180° rotational symmetry, a first axis A perpendicular to the symmetry axis S and extending generally parallel to the first edges in a top or bottom view of the cutting insert, and a second axis B perpendicular to both the symmetry axis S and to the first axis A, the second axis B extending along the second side surfaces and being transverse to the first side surfaces. In a top view of the inventive cutting insert, relative to an imaginary first edge tangent line A'-A' that is parallel to the first axis A and contains a first edge tangent point of the first edge proximate an associated first corner edge, each first edge converges inwardly at a first angle $\alpha$ towards the first axis and in a direction of an associated second corner edge. Also in the top view of the insert, relative to an imaginary second edge tangent line B'-B' that is parallel to the second axis B and contains a second edge tangent point proximate the associated second corner edge, each second edge converges inwardly at a second angle $\beta$ towards the second axis B and in a direction of an adjacent first corner edge. Furthermore, each of the at least one abutment surface portions is spaced apart from its associated first or second edge and has an orientation which is independent of an orientation of its said associated first or second edge.

In a side view of the insert cutting insert, the first corner edge may contain a portion that is not less distant from the bottom surface than any portion of the first edge.

The second edge may be generally parallel to the bottom surface.

At least a part of each of the first edges, the second edges, and the first corner edges is a cutting edge.

The second angle $\beta$ may be between 0° and 40°, and is more preferably between 18° and 22°.

The first angle $\alpha$ may be between 1° and 6°, and is more preferably between 2.5° and 3.5°.

In a side view of the cutting insert, the first side surfaces may each comprise a first relief surface portion extending downwardly from proximate the first edge and a first lower surface portion extending upwardly from proximate the bottom surface, with a first abutment surface portion located between the first relief surface portion and the first lower surface portion. Meanwhile, in an end view of the cutting insert, the second side surfaces may each comprise a second relief surface portion extending downwardly from proximate the second edge and a second lower surface portion extending upwardly from proximate the bottom surface, with a second abutment surface portion located between the second relief surface portion and the second lower surface portion.

Each of the abutment surface portions, the relief surface portions and the lower surface portions may be oriented differently with regard to the symmetry axis S.

Each first side surface may be generally parallel to the first axis A and each second side surface may be generally parallel to the second axis B.

First bottom edges defined at the intersection of the opposing first side surfaces with the bottom surface, may be generally parallel to the first abutment surface portions. Second bottom defined at the intersection of the opposing second side surfaces with the bottom surface, may be generally parallel to the second abutment surface portions.

The cutting insert may be provided with a clamping bore formed between the top surface and the bottom surface, for receiving a clamping screw.

The first abutment surface portions and the second abutment surface portions may be arranged approximately perpendicular to each other.

The bottom surface may form a base abutment surface that is generally perpendicular to the first and second abutment surface portions.

In a top view, the first edge tangent point forms the most distant point of the cutting insert relative to the first axis A and is closer to the first corner edge than to the second corner edge. Meanwhile, the second edge tangent point forms the most distant point of the cutting insert relative to the second axis B and is closer to the second corner edge than to the first corner edge.

In another aspect, the present invention is directed to a cutting tool comprising a holder having an cutting insert of the sort described above retained therein.

The tool has a longitudinal axis C of rotation defining an axially forward F direction and an axially rearward R direction. The holder has a front face and at least one pocket in which the inventive cutting insert is retained. An operative first edge of the cutting insert serves as a lateral cutting edge; an operative second edge of the cutting insert serves as a front cutting edge protruding beyond the front face of the holder; an operative first corner edge between the operative first edge and the operative second edge protrudes beyond a radial extent of the holder; the operative first edge is inclined with respect to the tool's axis of rotation C and extends radially inwardly and axially rearwardly from the operative first corner edge; and operative second edge is inclined with respect to an imaginary plane P3 extending perpendicularly to the tool's axis of rotation C and extends radially inwardly and axially forwardly from the operative first corner edge.

The operative first edge is capable of generating a lateral envelope of revolution comprising: a forward lateral portion which tapers radially inwardly and axially rearwardly, and forms a longitudinal relief angle $\alpha'$ between 0° and 10° with a second imaginary plane extending parallel the tool's axis of rotation C; and a rearward lateral portion which is generally cylindrical.

The longitudinal relief angle $\alpha'$ may be approximately 3°.

The first corner edge may protrude beyond the radial extent by approximately 0.1 mm to 0.75 mm, and more preferably protrudes beyond the radial extent by approximately 0.25 mm.

The operative second edge is capable of generating a second envelope of revolution that tapers radially outwardly and axially rearwardly and forms a forward angle $\beta'$ between 0° and 45° with respect to the imaginary plane P3 extending perpendicularly to the tool's axis of rotation C.

The forward angle $\beta'$ may be between 10° and 35°, and more preferably between 18° and 22°.

BRIEF DESCRIPTION OF THE FIGURES

For a better understanding of the present invention and to show how the same may be carried out in practice, reference will now be made to the accompanying drawings, in which.

DETAILED DESCRIPTION OF THE INVENTION

Figure 1:
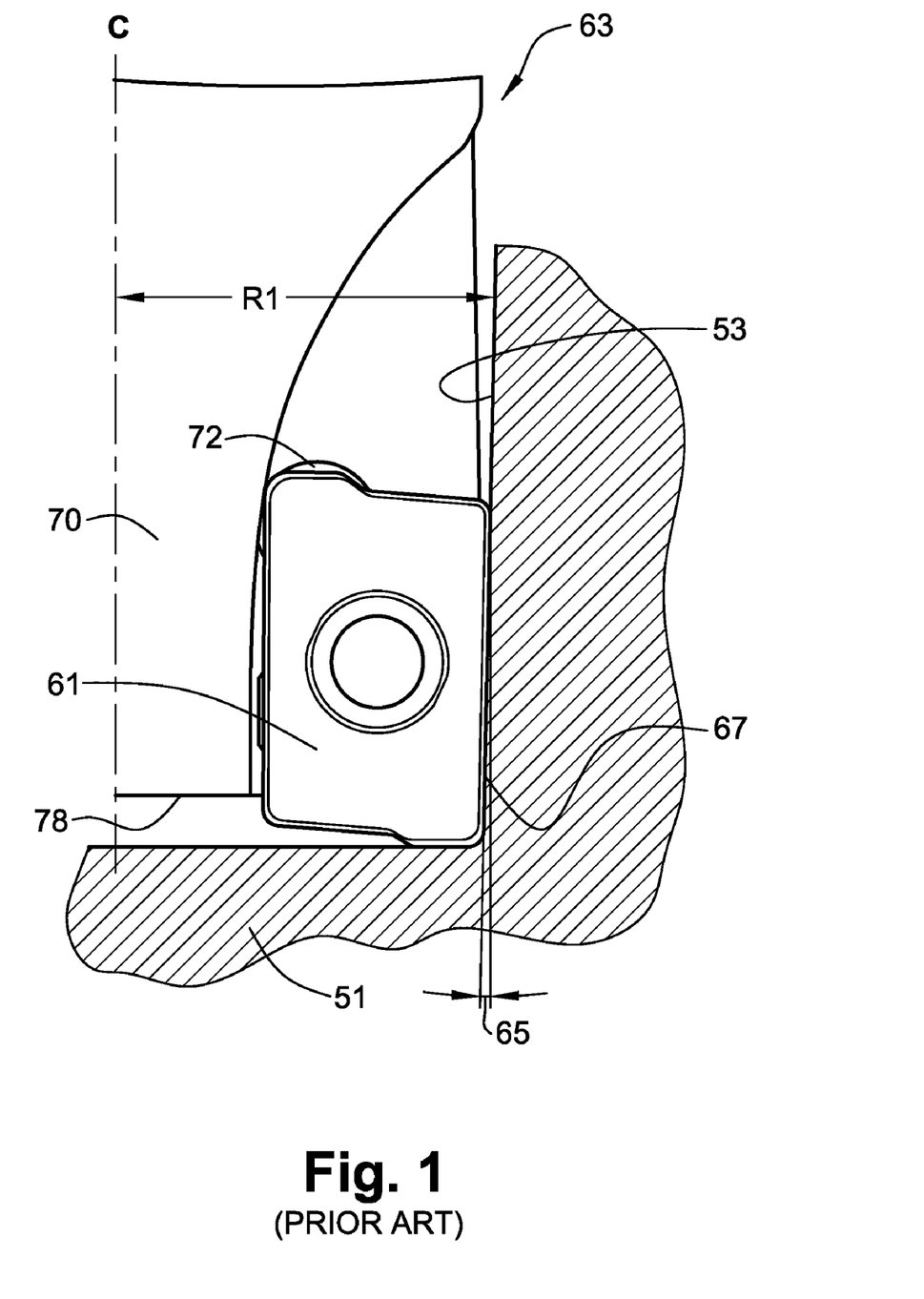
FIG. 1 shows a partial side view of a known cutting tool having a known holder with a known cutting insert of the prior art removably secured therein.

FIG. 1 shows a known cutting insert 61 clamped in a known insert receiving pocket 72 formed in a known holder 70 in the process of shoulder milling of a workpiece 51. The known insert receiving pocket 72, known holder 70 and known cutting insert 61 as shown in FIG. 1 are known in the art, and form a known rotary cutting tool 63 for milling a 90° shoulder 53 in the workpiece 51. In a side view of the known holder 70, the known insert 61 is so mounted in the known holder 70 as to provide a relief 65 opening towards a face 78 of the holder 70 along a radially outer lateral cutting edge 67 relative to the 90° shoulder 53 which is parallel to a longitudinal axis of rotation C of the known cutting tool 63. The distance between the 90° shoulder 53 and the axis of rotation C of the known cutting tool 63 is a cutting radius R1 of cutting tool 63.

Figure 2:
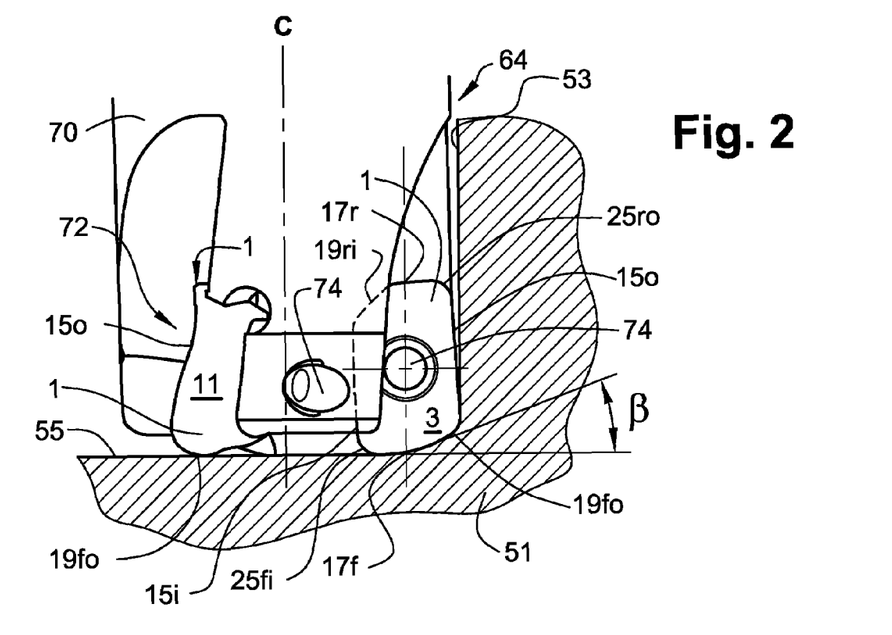
FIG. 2 shows a side view of the cutting tool in accordance with an exemplar embodiment of the present disclosure having the known holder and at least one cutting insert in accordance with an exemplar embodiment of the present disclosure removably retained therein.
Figure 3:
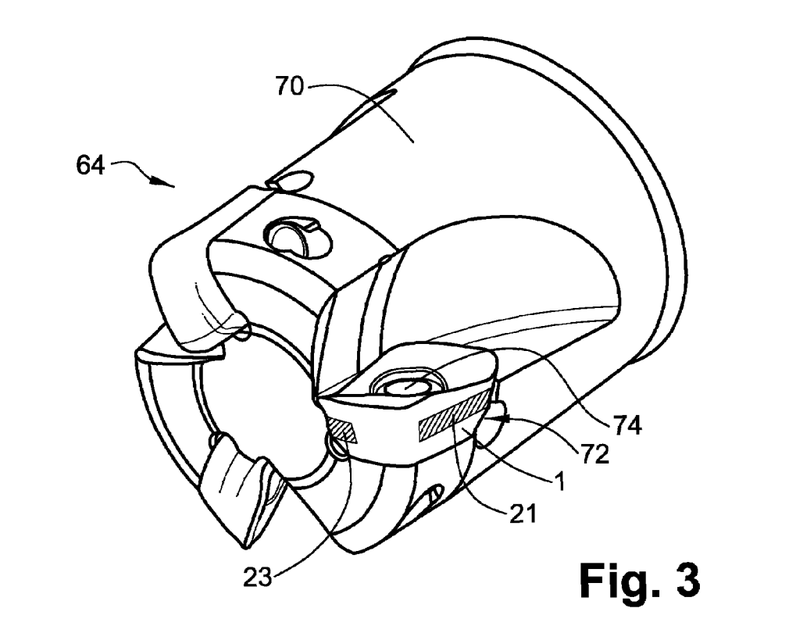
FIG. 3 shows a perspective view of a cutting tool shown in FIG. 2
Figure 4:
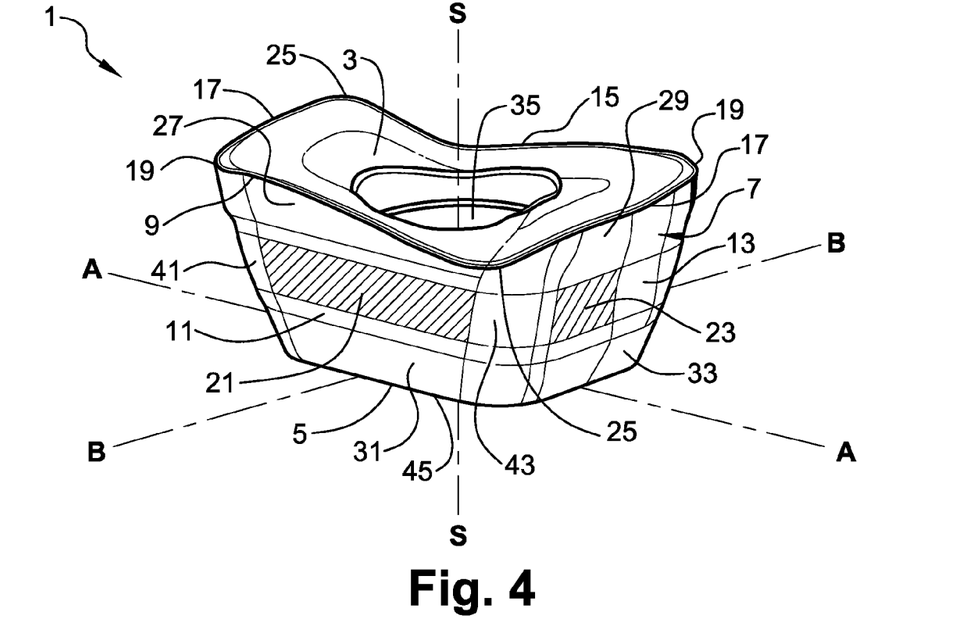
FIG. 4 shows a perspective view of the cutting insert shown in FIG. 2.

FIGS. 2 and 3 show a new cutting tool 64 comprising the known holder 70 provided with at least one known insert receiving pocket 72, and in this particular embodiment with three known insert receiving pockets 72. However, the number of insert receiving pockets may vary. In new cutting tool 64, each known pocket 72 accommodates a new cutting insert 1 in accordance with one exemplar embodiment of the present disclosure. Each new cutting insert is releasable secured to the pocket 72, in an exemplar way, by means of a clamping bolt 74. However, other clamping means may be employed. The holder 70 and the new cutting insert 1 thus form new cutting tool 64 with a longitudinal axis of rotation C which defines an axially forward direction F and an axially rearward direction R.

Reference is now made to FIGS. 4 to 9. New cutting insert 1 comprises a top surface 3 and a bottom surface 5 as well as a peripheral side surface 7 extending therebetween. Peripheral side surface 7 has at least two opposing first (main) side surfaces 11 and two opposing second (minor) side surfaces 13. A top peripheral edge 9 is defined at the intersection of the peripheral side surface 7 and the top surface 3. Portions of top peripheral edge 9 are further referred to also as first (main) edges 15 and second (minor) edges 17. Particularly, new cutting insert 1 of the one exemplar embodiment may have at least two first edges 15 defined at the intersection of the at least two first side surfaces 11 with the top surface 3, and at least two second edges 17 defined at the intersection of the at least two second side surfaces 13 with the top surface 3.

Each second side surface 13 extends away from a following first side surface 11 to a preceding first side surface 11. Each second surface 13 merges with the following first side surface 11 through a first corner surface 41 and with the preceding first side surface 11 through a second corner surface 43. The first corner surface 41 intersects the top surface at a first corner edge 19, and the second corner surface 43 intersects the top surface 3 at a second corner edge 25. Thus, each second edge 17 meets a following first edge 15 at the first corner edge 19, and extends away therefrom to the second corner edge 25 formed at the transition from the second edge 17 to the preceding first edge 15. As best seen in the side view of FIG. 6, as a given first edge 15 extends away from an associated first corner edge 19 it initially extends parallel to the bottom surface 5, then slopes in a direction towards the bottom surface 5 and finally slopes away from the bottom surface 5 towards an associated second corner edge 25. Hence, in a side view of the cutting insert 1 each first edge 15 has a wavy shape. Each first edge being a maximum distance from the bottom surface 5 adjacent an associated first corner edge 19 and a minimum distance from the bottom surface 5 adjacent an associated second corner edge 25. The first corner 19 contains a portion that is not less distant from the bottom surface 5 than any portion of the first edge 15. As best seen in the end view of FIG. 9, second edges 17 in the exemplar embodiment are substantially parallel to the bottom surface 5. Optionally, however, the second edges 17 may instead slope either in a direction away from, or towards to, the bottom surface 5, as they extend away from the associated first corner edge 19.

The new cutting insert 1 has an axis of symmetry S extending through the opposing top 3 and bottom 5 surfaces generally perpendicularly to the bottom surface 5 thereof. New cutting insert 1 of the given embodiment may have a 180° rotational symmetry about the axis of symmetry S, and is adapted to be two-way-indexable about the axis of symmetry S when it is releasably secured in the insert receiving pocket 72.

Figure 5:
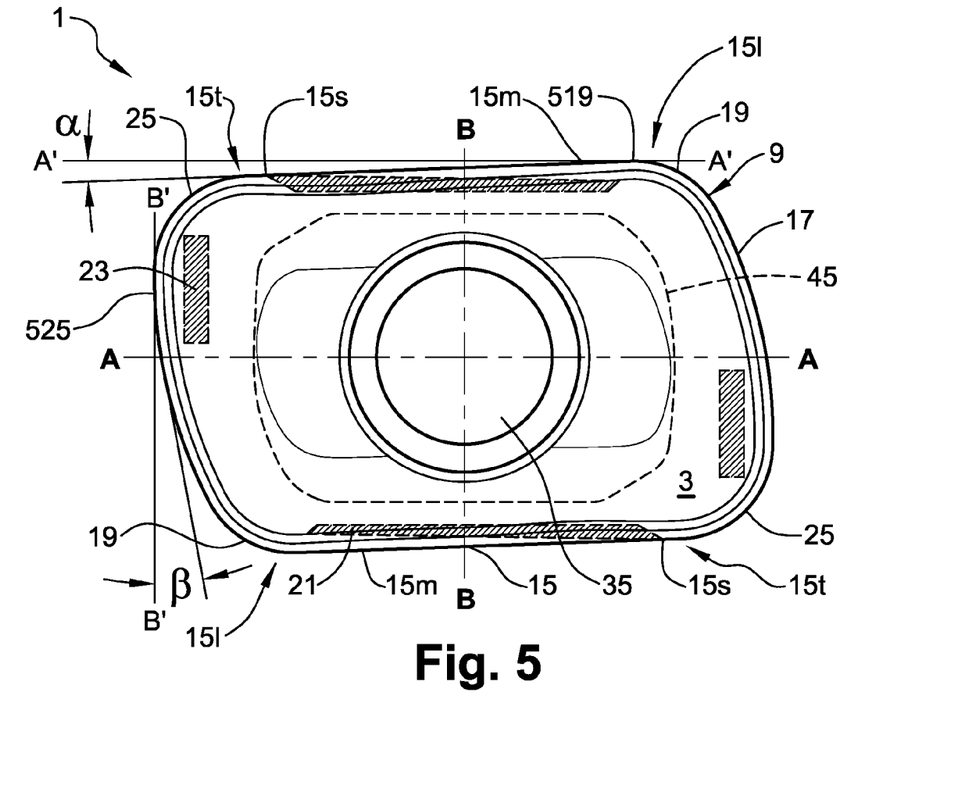
FIG. 5 shows a top view of the cutting insert shown in FIG. 4.
Figure 6:
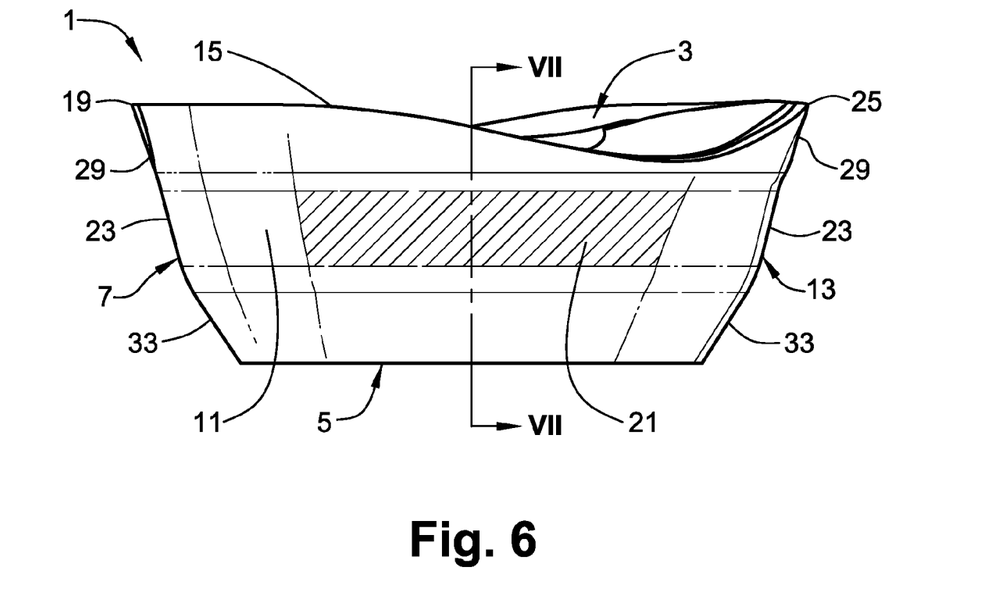
FIG. 6 shows a side view of the cutting insert shown in FIG. 4.
Figure 8:
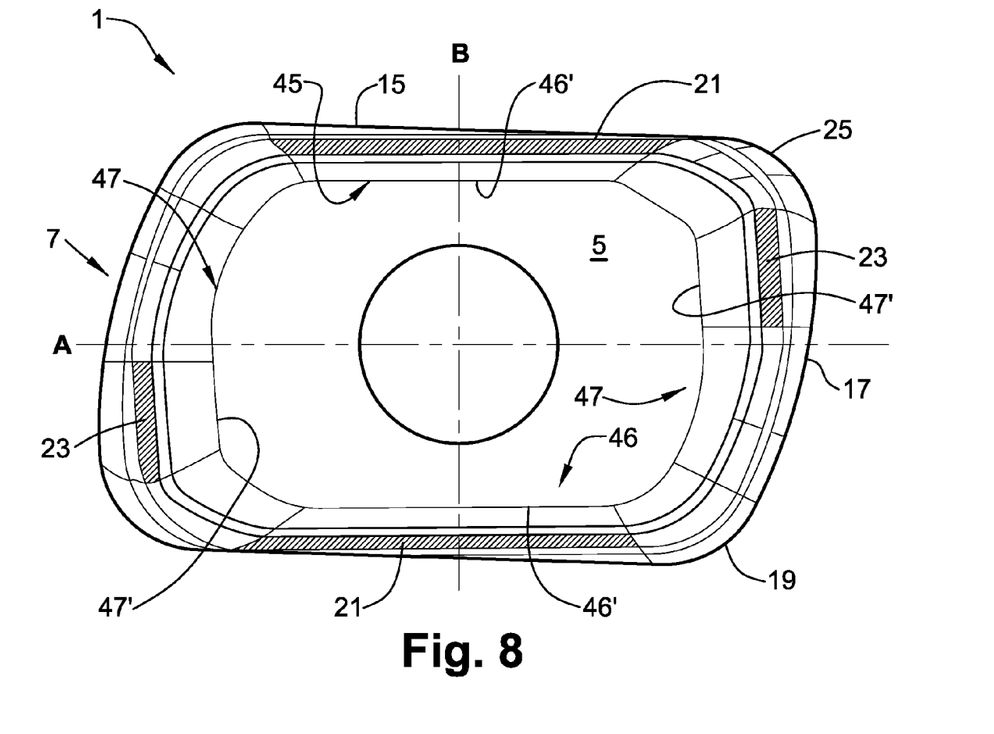
FIG. 8 shows a bottom view of the cutting insert shown in FIG. 4.

Given insert 1 optionally has a generally rectangular or a generally parallelogram shape in a top view, and may have a first (main) axis A perpendicular to the symmetry axis S and a second (minor) axis B perpendicular to both the first axis A and the symmetry axis S. As best seen in FIG. 5 and FIG. 8, in the exemplar embodiment shown, the first axis A extends generally parallel to the first edges 15 while the second axis B generally extends transverse to the first edges 15.

The first axis A and second axis B form a first imaginary plane which is perpendicular to the symmetry axis S and generally parallel to the top 3 and bottom 5 surfaces. The first axis A and symmetry axis S form a second imaginary plane which is perpendicular to the second axis B and thus is generally perpendicular to the top 3 and bottom 5 surfaces. Finally, the second axis B and symmetry axis S form a third imaginary plane which is perpendicular to the first axis A and thus is generally perpendicular to the top 3 and bottom 5 surfaces.

As is best shown in FIG. 2, in each of the indexable positions of the given insert 1 in the insert receiving pocket 72 of the holder 70, one of the at least two first edges 15 is a radially-outer (operative) first edge 15o, and another of the at least two first edges is a radially-inner (non-operative) first edge 15i. Additionally, one of the two opposing second edges is an axially-forward (operative) second edge 17f, and the other of the two opposing second edges 17 is an axially-rearward (non-operative) second edge 17r.

As seen in FIG. 2, when the given insert 1 is mounted in a given indexable position in the holder 70, the axially-forward operative second edge 17f extends from a forward-inner second corner 25fi to a forward-outer first corner 19fo. Naturally, when the given insert 1 is rotated by 180° in the insert receiving pocket 72, the first edge 15, which was previously the radially-outer operative first edge, now becomes the radially-inner non-operative first edge, and the second edge 17, which was previously the axially-forward operative second edge now becomes the axially-rear non-operative second edge. Similarly, when indexed, the first corner edge 19 which was previously the forward-outer first corner 19fo becomes a rearward-inner first corner 19ri, and the second corner edge 25 which previously was the forward-inner second corner 25fi now becomes a rearward-outer second corner 25ro. In each indexable position, the radially-outer operative first edge 15o extends axially forwardly from the rearward-outer second corner 25ro to the forward-outer first corner 19fo, and the axially-forward operative second edge 17f extends from the forward-outer operative first corner 19fo to the forward inner second corner 25fi, away from which there extends the radial-inner first edge 15i.

As seen in the top view of FIG. 5, each of the first edges 15 has a first edge main portion 15m proximate its leading end 15l. The first edge main portion 15m extends in a first orientation with respect to the first axis A at a first main portion angle α. In particular, the first edge main portion 15m extends in a direction away from the associated first corner edge 19 at the main portion angle α, relative to an imaginary first edge tangent line A'-A' to the first edge 15, wherein the imaginary first edge tangent line A'-A' is parallel to the first axis A and meets the first edge 15 at a first edge tangent point 519 proximate the associated first corner edge 19. The main portion angle a ranges between approximately 1° and 10° in the top view of the insert 1, and more preferably is approximately 3°, in a top view of the given insert 1.

As seen in the top view of FIG. 5, the first edge tangent point 519 forms the most distant point of the cutting insert relative to the first axis A, and is closer to the first corner edge 19 than to the second corner edge 25.

As also seen in FIG. 5, each of the first edges 15 also has a first edge secondary portion 15s proximate its trailing end 15t. The first edge secondary portion 15s extends from, and is slightly angled with respect to, the first edge main portion 15m. The first edge secondary portion 15s extends to the adjacent second corner edge 25 in a direction that is substantially parallel to first axis A, so that each first edge 15 has a section with a slight bend and thus is concave in a top view of the given insert 1. The first edge main portion 15m is a straight line section in a top view and extends approximately from the first edge tangent point 519 to approximately where the slight bend begins.

Each of the first corner edges 19 is formed between the main portion 15m of the first edge 15 at the latter's leading end 15l and an associated second edge 17. Similarly, each of the second corner edges 25 is formed between the secondary portion 15s of a first edge 15 at the latter's trailing end 15t and an adjacent second edge 17.

Each of the second edges 17 extends in a second orientation with respect to the second axis B at a second angle β opening towards the associated first corner edge 19 in a top view of the given insert 1. In particular, each second edge 17 extends towards the associated first corner edge 19 at the second angle β, relative to an imaginary second edge tangent line B'-B' to the second edge 17, wherein the imaginary second edge tangent line B'-B' is parallel to the second axis B and meets the second edge 17 at a second edge tangent point 525 proximate the second corner edge 25. Second angle β may range between approximately 0° and 45° and more preferably is between 10° and 35°. Optionally, each of the second edges 17 may be convex in a top view of the given insert 1.

As seen in the top view of FIG. 5, the second edge tangent point 525 forms the most distant point of the cutting insert relative to the second axis B, and is closer to the second corner edge 25 than to the first corner edge 19.

Figure 9:
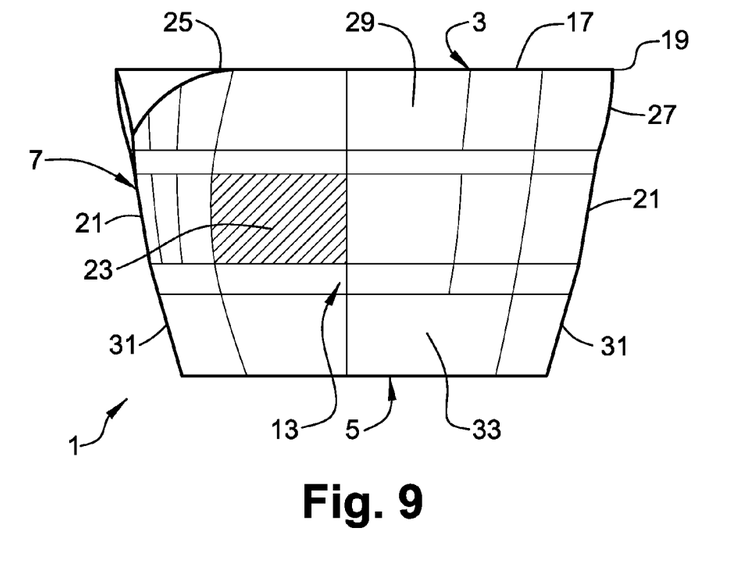
FIG. 9 shows an end view of the cutting insert shown in FIG. 4.

Each of the first corner edges 19 is generally convex in top view of the given insert 1 (see FIG. 5), and extends from the adjacent second edge 17 to the adjacent first edge 15 substantially parallel to the bottom surface 5 of the given insert 1 (see FIG. 9). Each of the second corner edges 25 is generally convex in top view of the given insert 1, and extends from the adjacent first edge 15 to the adjacent second edge 17 in a direction away from the bottom surface 5 of the given insert 1.

As best seen in FIG. 8, peripheral side surface 7 defines at its transition with bottom surface 5 a bottom peripheral edge 45. Portions of bottom peripheral edge 45 are further referred to also as first bottom edges 46 and second bottom edges 47. Particularly, given insert I may have at least two bottom first edges 46 defined at the intersection of the at least two first side surfaces 11 with the bottom surface 5, and at least two bottom second edges 47 defined at the intersection of the at least two second side surfaces 13 with the bottom surface 5. At least a portion 46' of each first bottom edge 46 is generally parallel to the first axis A and at least a portion 47' of each second bottom edge 47 is generally parallel to the second axis B.

The first 11 side surfaces of a given insert 1 each comprise at least one first abutment surface portion 21, and the second 13 side surfaces of the given insert 1 each comprise at least one second abutment surface portion 23. The abutment surface portions 21, 23 provide abutting contact with the pocket. The first 11 and second 13 side surfaces further comprise a first and second relief surface portions 27, 29, respectively, which extend downwardly from proximate the first and second edges 15, 17, respectively, in the direction of the bottom surface 5. The bottom surface 5 of the given insert 1 forms a base abutment surface for providing abutting contact with the pocket. The first 11 and second 13 side surfaces may further comprise optional first 31 and second 33 lower surface portions, respectively, which extend upwardly from proximate the bottom surface 5.

Each of the at least one abutment surface portions 21, 23 may be spaced apart from its associated cutting edge 15, 17, respectively, by at least the relief surfaces 27, 29, respectively. The abutment surface portions 21, 23 have an orientation that differs from that of their associated relief surfaces 27, 29. Therefore, each of the abutment surface portions 21, 23 has an orientation which is independent of an orientation of the associated first 15 or second 17 edges. Instead, each of the abutment surface portions 21, 23 is generally aligned with the respective associated first or second bottom edge 46, 47. The abutment surface portions 21, 23 may extend from the relief surface portions 27, 29 either to the optional lower surface portion 31, 33 (when present), or to the bottom surface 5.

In the given embodiment shown in FIGS. 2 to 6, 8, 9, abutment surfaces 21 and 23, respectively, are illustrated, by way of example only, with a grey shade. However, the respective surface portions are of exemplary nature only and may have different positions and/geometrical extensions than those shown.

The given insert 1 may optionally comprises a bore 35 extending from the top surface 3 to the bottom surface 5 for clamping the insert to the holder 70 by means of the bolt 74, as known in the art, such as, but not limited to, a clamping screw. However, other embodiments may be clamped in a different manner, such as by wedges, and/or by levers, or other clamping means, which are well-known in the art. Moreover, the given insert 1 may be, again by way of example, of a tangential or "lay-down" type, in which case a clamping bore may extend between two opposing side faces of the insert.

Figure 7:
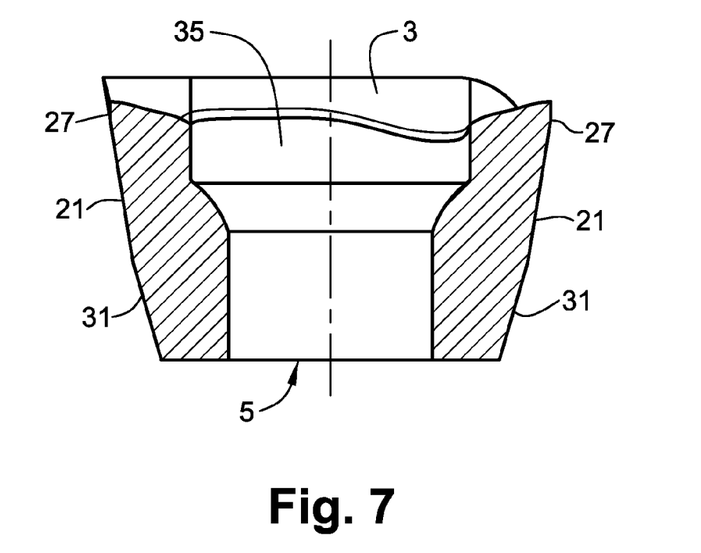
FIG. 7 shows a sectional view of the cutting insert of FIG. 6 taken along the line VII-VII.

As the given insert 1 is designed to be releasably secured in the same pocket 72 of the known holder 70 in which the known insert 61 is accommodated, the given insert 1 is of the same general type of insert as is the known insert 61. By way of example only, the present disclosure illustrates the inventive insert 1 to be similar to, but patentably distinct from, inserts called "Helimill®" which are manufactured and sold by Iscar®, and are so-called "positive" inserts. Therefore, and again by way of example only, given insert 1 may also be of the "positive" type, with peripheral surface 7 optionally being inclined downwardly and inwardly from the top surface 3 towards the bottom surface 5. However, to facilitate clamping of the given insert 1 in the same known holder 70 capable of accommodating known inserts 61, portions of the second side surface 13, namely relief surface portion 29, abutment portion 23 and optional lower surface portion 33 are clearly visible as having different orientations or inclinations, in particular relative to the bottom surface 5. Correspondingly, as shown in FIGS. 7 and 9, first side surface portions, namely relief surface portion 27, radial abutment surface portion 21 and optional lower surface portion 31 are clearly visible as having different inclinations or orientations.

Figure 10:
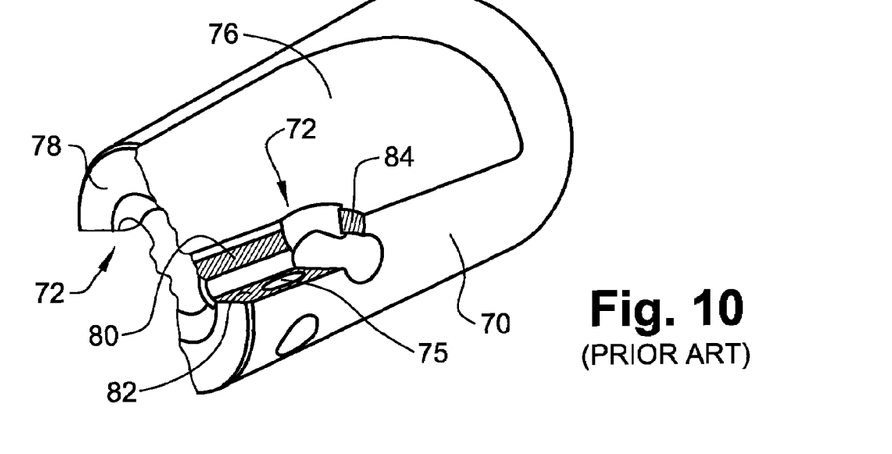
FIG. 10 shows a perspective view of a pocket of the known holder shown in FIG. 1.

FIG. 10 schematically shows known holder 70 having at least one insert pocket 72, at least one chip groove portion 76 associated with the at least one insert pocket 72, and a front face 78. In this particular embodiment holder 70 has two insert receiving pockets 72. Said pocket 72 of holder 70 comprises three support surfaces 80, 82, 84 for supporting contact with the abutment surfaces 21, 5, 23 of the given insert 1, respectively. In particular, each of support surfaces 80, 82 and 84 is for supporting contact with one of the abutment surfaces 21, 5, 23 of the supported given insert 1. The axial support surface 84 of holder 70 is designed for supporting contact with axial abutment surface portion 23 of the second side surface 13 of the given insert 1 and for providing axial support to the given insert 1 in the pocket 72; the radial support surface 80 is designed for abutting contact with radial abutment surface portion 21 provided on first side surface 11 of the given insert 1; and base support surface 82 is designed for supporting contact with the bottom surface 5 of the given insert 1. Potentially, pocket 72 of holder 70 may be provided with a hole or bore 75 for receiving a clamping bolt, not shown. However, as explained previously, other clamping means and mechanisms may be provided in the pocket, or, in case of, for example, tangential inserts, axial support surface 84 and/or radial support surface 80 of the pocket 72 may be provided with a hole or bore for receiving, for example, a clamping bolt.

Figure 11:
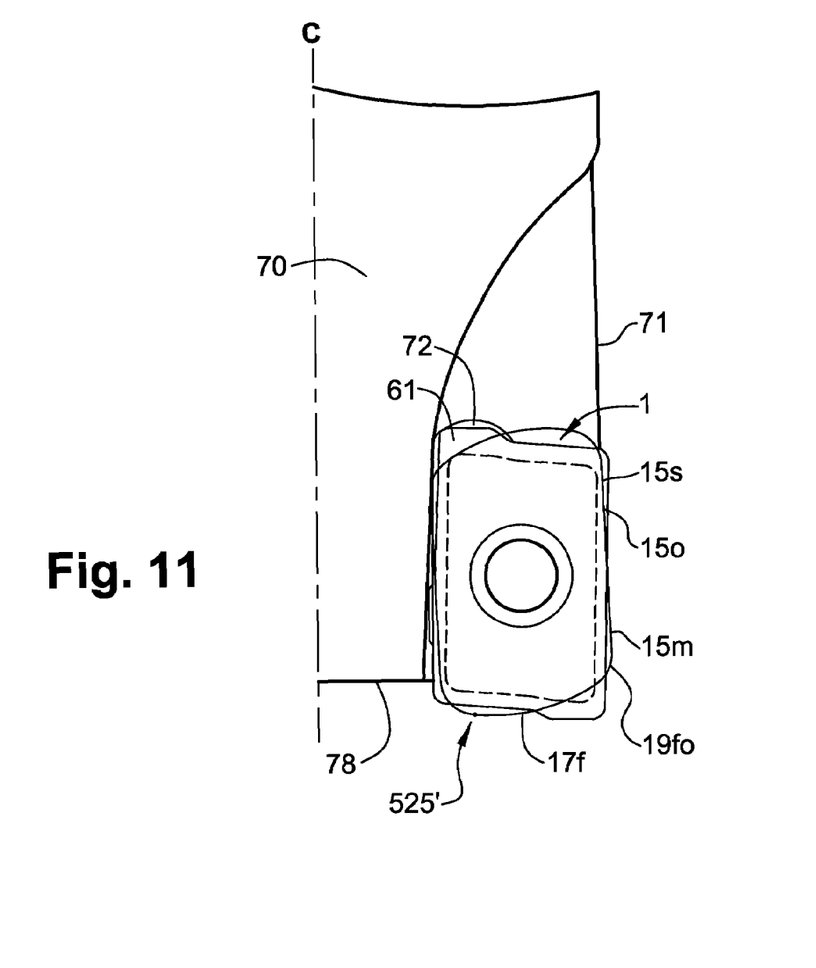
FIG. 11 shows a schematic view of the holder shown in FIG. 2, showing overlapping outlines of both the insert known in the art as shown in FIG. 1 and an outline of the insert according to the exemplar embodiment of the present disclosure as shown in FIG. 2.

FIG. 11 shows the arrangement according to FIG. 1 as discussed above wherein the outline of the inventive insert 1 has been superimposed. Preferably, holder 70 has at least one pocket for receiving a 90° shoulder milling, known cutting insert 61. Optionally, same pocket 72 is capable of receiving also given insert 1.

When the insert 1 is seated in the prior art holder 70, the forwardmost point 525' of the insert 1 is found on the radially inward side of the axially-forward second edge 17f. In this position, the axially forward operative second edge 17f protrudes axially forwardly beyond the face 78 of the holder 70 and may serve as a front cutting edge. The operative forward-outer first corner edge 19fo protrudes beyond a radial extent 71 of the holder 70. The first edge main portion 15m is inclined with respect to the axis of rotation C of the holder 70 and converges radially inwardly towards the holder 70 while extending axially rearwardly away from the forward-outer first cutting corner edge 19fo. The first edge secondary portion 15s is generally cylindrical and generally parallels the radial extent 71.

Figure 12:
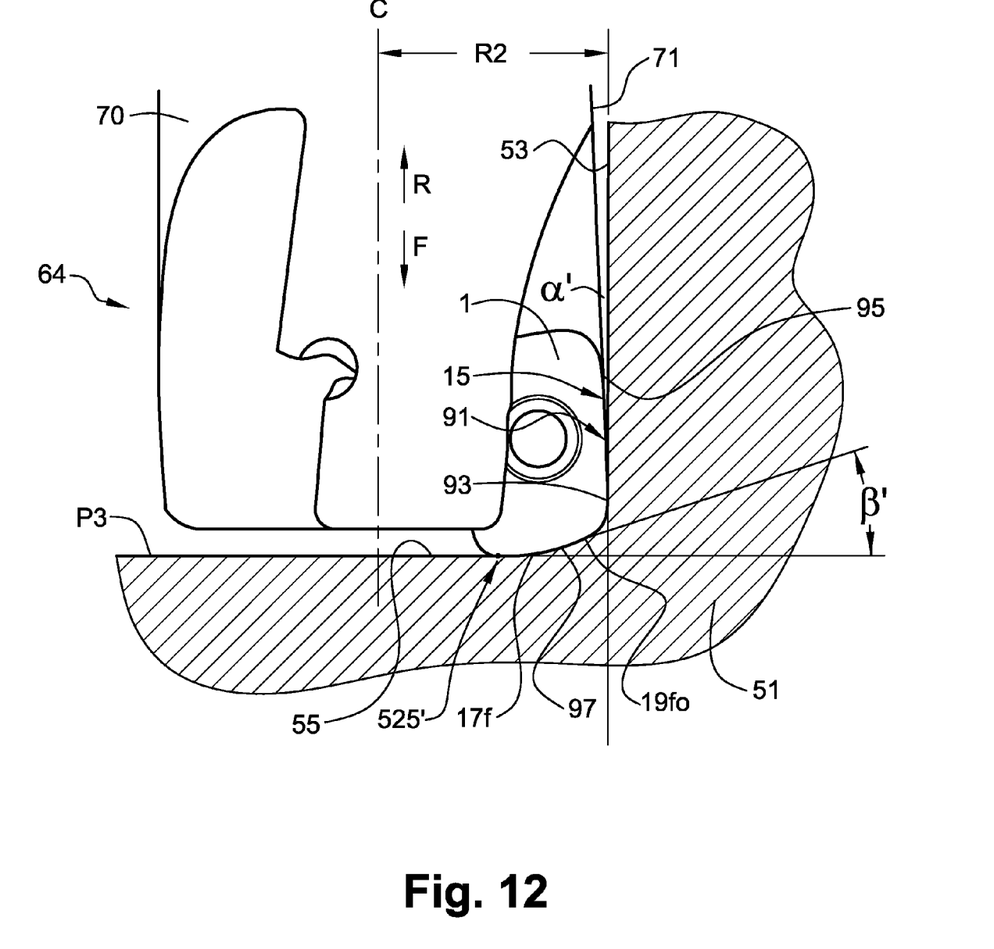
FIG. 12 shows a schematic side view of an envelope generated by the cutting tool shown in FIG. 2, taken in a plane extending through the axis of rotation of the cutting tool.

As seen in FIG. 12, the operative second edge 17f is inclined with regard to an imaginary plane P3 which extends perpendicularly to the axis of rotation C of the holder 70. The operative second edge (17f) also extends radially inwardly and axially forwardly from the operative first corner edge (19fo).

The operative radially-outer first edge 15o of the cutting insert generates an axially rearwardly extending lateral envelope of revolution 91, as shown in FIG. 12. The operative first edge main portion 15m generates a first lateral portion 93 of the lateral envelope of revolution 91 forming a longitudinal relief angle $\alpha'$, preferably corresponding to first angle $\alpha$, of approximately between 0° and 10°, more preferably between 2.5° and 3.5°, and most preferably approximately 3° with a 90° shoulder 53 in a workpiece 51. The lateral envelope of revolution has a second lateral portion 95 generated by the operative first edge secondary portion 15s that is generally cylindrical and generally parallels the 90° shoulder 53.

The operative forward-outer first corner edge 19fo of the given insert 1 extends, in a radial direction of the tool 64 perpendicular to the rotary axis C of the holder 70, beyond the radial extent 71 of holder 70, to generate a cutting radius R2 of the tool 64. The cutting radius R2 of tool 64 is greater than the cutting radius R1 of tool 63 being provided with a known insert 61, by approximately 0.1 mm to 0.75 mm, preferably by approximately 0.25 mm resulting in a total increase of cutting diameter by 0.5 mm vis-à-vis the holder 70 being provided with an ordinary insert 61. The clearance between the first edge secondary portion 15s and the 90° shoulder 53 of workpiece 51 may be approximately between about 0.2 and 0.6 mm and preferably approximately 0.4 mm.

The operative axially-forward second edge 17f of the given insert 1 generates a second envelope of revolution 97 that tapers radially outwardly while extending axially rearwardly from a shoulder face 55 being machined in the workpiece 51. Preferably, this taper is at a second angle β', of approximately between 0° and 45°, more preferably between 10° and 35°, still more preferably between 18° and 22°, and most preferably approximately 20° with the shoulder face 55. Ideally, the shoulder face 55 lies in the imaginary plane P3 which is perpendicular to the holder's longitudinal axis of rotation C and contains the forwardmost point 525' of the retained insert (1).

The second corner of the insert according to the present disclosure is optionally designed to allow performing of ramp-down operations, wherein, in addition, the second side surface provides an abutment surface for the provision of axial support in the pocket of a holder. The ramp down capacity is increased with the height difference between the second corner edge and a low point of the adjacent longitudinal edge.

The cutting insert according to the present disclosure is preferably of the sintered type and is preferably made of any of the known ceramic or metal alloy based materials that can be sintered.

The insert and/or tool according to the present disclosure may facilitate high feed rate machining by avoiding excess power requirements for the machine, excess load on and vibrations and chattering of the cutting tool and damages to the machined surfaces of a workpiece. The insert according to the present disclosure may be implemented in a variety of products that are to produce a 90° shoulder in a workpiece, including inserts with a square or rectangular profile when relief is required on the original cutting edge.

Although the present invention has been described to a certain degree of particularity, it should be understood that various alterations and modifications could be made without departing from the scope of the invention as hereinafter claimed.

What is claimed is:

1. A cutting insert (1) comprising:
opposing top (3) and bottom (5) surfaces;
a peripheral side surface (7) extending between the top (3) and bottom (5) surfaces, the peripheral side surface (7) comprising opposing first side surfaces (11) connecting to opposing second side surfaces (13), each of the first side surfaces (11) and the second side surfaces (13) comprising at least one abutment surface portion (21, 23) suitable for seating the cutting insert;
a top peripheral edge (9) formed between the peripheral side surface (7) and the top surface (3), the top peripheral edge (9) comprising:
opposing first edges (15) at the intersection of the first side surfaces (11) with the top surface (3);
opposing second edges (17) at the intersection of the second side surfaces (13) with the top surface (3), the two opposing first edges (15) extending transversely to the two opposing second edges (17);
a first pair of diagonally opposed first corner edges (19), each first corner edge (19) defined between a leading end (15l) of a first edge (15) and an associated second edge (17); and
a second pair of diagonally opposed second corner edges (25), each second corner edge (25) defined between a trailing end (15t) of the first edge (15) and an adjacent second edge (17);
a symmetry axis (S) extending through the opposing top (3) and bottom (5) surfaces about which the insert has a 180° rotational symmetry;
a first axis (A) perpendicular to the symmetry axis (S) and extending generally parallel to the first edges (15) in a top or bottom view of the cutting insert (1);
a second axis (B) perpendicular to both the symmetry axis (S) and to the first axis (A), the second axis (B) extending along the second side surfaces and being transverse to the first side surfaces;
wherein:
in a top view of the cutting insert, relative to an imaginary first edge tangent line A'-A' that is parallel to the first axis (A) and contains a first edge tangent point (519) of the first edge (15) proximate an associated first corner edge (19), each first edge (15) converges inwardly at a first angle (α) towards the first axis (A) and in a direction of an associated second corner edge (25);
and
each of the at least one abutment surface portions (21, 23) is spaced apart from its associated first or second edge (15, 17) and has an orientation which is independent of an orientation of its said associated first or second edge (15, 17).

2. The cutting insert according to claim 1, wherein in a side view of the insert, the first corner edge (19) contains a portion that is not less distant from the bottom surface (5) than any portion of the first edge (15).

3. The cutting insert according to claim 1, wherein the second edge (17) is generally parallel to the bottom surface (5).

4. The cutting insert according to claim 1, wherein at least a part of each of the first edges (15), the second edges (17), and the first corner edges (19) is a cutting edge.

5. The cutting insert according to claim 1, wherein in a top view of the insert, relative to an imaginary second edge tangent line B'-B' that is parallel to the second axis (B) and contains a second edge tangent point (525) proximate the associated second corner edge (25), each second edge (17) converges inwardly at a second angle (β) towards the second axis (B) and in a direction of an adjacent first corner edge (19) the second angle (β) is between 0° and 40°.

6. The cutting insert according to claim 5, wherein the second angle (β) is between 18° and 22°.

7. The cutting insert according to claim 1, wherein the first angle (α) is between 1° and 6°.

8. The cutting insert according to claim 7, wherein the first angle (α) is between 2.5° and 3.5°.

9. The cutting insert according to claim 1, wherein:
in a side view, the first side surfaces (11) each comprise a first relief surface portion (27) extending downwardly from proximate the first edge (15) and a first lower surface portion (31) extending upwardly from proximate the bottom surface (5), with the first abutment surface portion (21) located between the first relief surface portion (27) and the first lower surface portion (31); and
in an end view, the second side surfaces (13) each comprise a second relief surface portion (29) extending downwardly from proximate the second edge (17) and a second lower surface portion (33) extending upwardly from proximate the bottom surface (5), with the second abutment surface portion (23) located between the second relief surface portion (29) and the second lower surface portion (33).

10. The cutting insert according to claim 9, wherein each of the abutment surface portions (21, 23), the relief surface portions (27, 29) and the lower surface portions (31, 33) is oriented differently with regard to the symmetry axis (S).

11. The cutting insert according claim 1, wherein:
each first side surface (11) is generally parallel to the first axis (A) and each second side surface (13) is generally parallel to the second axis (B).

12. The cutting insert according to claim 1, wherein:
first bottom edges (46) are defined at the intersection of the opposing first side surfaces (11) with the bottom surface (5), the first bottom edges (46) being generally parallel to the first abutment surface portions (21); and
second bottom edges (47) are defined at the intersection of the opposing second side surfaces (13) with the bottom surface (5), the second bottom edges (47) being generally parallel to the second abutment surface portions (23).

13. The cutting insert according to claim 1, wherein the cutting insert has a clamping bore (35) formed between the top surface (3) and the bottom surface (5), for receiving a clamping screw.

14. The cutting insert according to claim 1, wherein the first abutment surface portions (21) and the second abutment surface portions (23) are arranged approximately perpendicular to each other.

15. The cutting insert according to claim 14, wherein the bottom surface (5) forms a base abutment surface that is generally perpendicular to the first (21) and second (23) abutment surface portions.

16. The cutting insert according to claim 5, wherein, in a top view:
the first edge tangent point (519) forms the most distant point of the cutting insert relative to the first axis (A), and is closer to the first corner edge (19) than to the second corner edge (25); and
the second edge tangent point (525) forms the most distant point of the cutting insert relative to the second axis (B), and is closer to the second corner edge (25) than to the first corner edge (19).

17. A cutting tool (64) comprising:
a holder (70); and
at least one cutting insert (1) in accordance with claim 1 retained in the holder.

18. The cutting tool (64) according to claim 17, wherein:
the tool (64) has a longitudinal axis (C) of rotation defining an axially forward (F) and an axially rearward (R) direction;

the holder (70) has a front face (78) and at least one pocket (72) in which said cutting insert (1) is retained:
an operative first edge (15) of the cutting insert (1) serves as a lateral cutting edge;
an operative second edge (17) of the cutting insert (1) serves as a front cutting edge protruding beyond the front face (78) of the holder (70);
an operative first corner edge (19) between the operative first edge (15) and the operative second edge (17) protrudes beyond a radial extent (71) of the holder (70);
the operative first edge (15) is inclined with respect to the tool's axis of rotation (C) and extends radially inwardly and axially rearwardly from the operative first corner edge (19); and
the operative second edge (17) is inclined with respect to an imaginary plane (P3) extending perpendicularly to the tool's axis of rotation (C) and extends radially inwardly and axially forwardly from the operative first corner edge (19).

19. The cutting tool (64) according to claim 18, wherein:
the operative first edge (15) is capable of generating a lateral envelope of revolution (91) comprising:
a forward lateral portion (93) which tapers radially inwardly and axially rearwardly, and forms a longitudinal relief angle ($\alpha'$) between 0° and 10° with a second imaginary plane extending parallel the tool's axis of rotation (C); and
a rearward lateral portion (95) which is generally cylindrical.

20. The cutting tool (64) according to claim 19, wherein the longitudinal relief angle ($\alpha'$) is approximately 3°.

21. The cutting tool (64) according to claim 19, wherein the first corner edge (19) protrudes beyond the radial extent (71) by approximately 0.1 mm to 0.75 mm.

22. The cutting tool (64) according to claim 21, wherein the first corner protrudes beyond the radial extent (71) by approximately 0.25 mm.

23. The cutting tool (64) according to claim 19, wherein:
the operative second edge (17) is capable of generating a second envelope of revolution (97) that tapers radially outwardly and axially rearwardly and forms a forward angle ($\beta'$) between 0° and 45° with respect to said imaginary plane (P3) extending perpendicularly to the tool's axis of rotation (C).

24. The cutting tool (64) according to claim 18, wherein the operative second edge (17) is capable of generating an envelope of revolution (97) that tapers radially outwardly and axially rearwardly and forms a forward angle ($\beta'$) between 0° and 45° with respect to said imaginary plane (P3) extending perpendicularly to the tool's axis of rotation (C).

25. The cutting tool (64) according to claim 24, wherein the forward angle ($\beta'$) is between 10° and 35°.

26. The cutting tool (64) according to claim 25, wherein the forward angle ($\beta'$) is between 18° and 22°.

* * * * *